US012594775B2

(12) United States Patent
Moriyama

(10) Patent No.: US 12,594,775 B2
(45) Date of Patent: Apr. 7, 2026

(54) PRINTING APPARATUS

(71) Applicant: SEIKO EPSON CORPORATION, Tokyo (JP)

(72) Inventor: Ryuji Moriyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 167 days.

(21) Appl. No.: 18/358,731

(22) Filed: Jul. 25, 2023

(65) Prior Publication Data

US 2024/0034076 A1 Feb. 1, 2024

(30) Foreign Application Priority Data

Jul. 28, 2022 (JP) ................................ 2022-120269

(51) Int. Cl.
*B41J 11/06* (2006.01)
*B41J 11/00* (2006.01)

(52) U.S. Cl.
CPC ............ *B41J 11/06* (2013.01); *B41J 11/0085* (2013.01)

(58) Field of Classification Search
CPC ............................... B41J 11/06; B41J 11/0085
See application file for complete search history.

(56) References Cited

U.S. PATENT DOCUMENTS

| | | | | |
|---|---|---|---|---|
| 2012/0154500 | A1* | 6/2012 | Kajino | B41J 2/145 347/104 |
| 2017/0136787 | A1* | 5/2017 | Martin Vidal | B41J 11/0085 |
| 2017/0320338 | A1* | 11/2017 | Martin | B41J 11/06 |
| 2018/0093500 | A1* | 4/2018 | Bryde | B41J 11/06 |
| 2020/0207127 | A1 | 7/2020 | Fujisawa et al. | |

FOREIGN PATENT DOCUMENTS

| | | | | |
|---|---|---|---|---|
| CN | 102673184 A | * | 9/2012 | B41J 11/20 |
| JP | 2020-104343 A | | 7/2020 | |

OTHER PUBLICATIONS

English Translation CN-102673184-A (Year: 2012).*

* cited by examiner

*Primary Examiner* — Shelby L Fidler
*Assistant Examiner* — Tracey M Mcmillion
(74) *Attorney, Agent, or Firm* — WORKMAN NYDEGGER

(57) ABSTRACT

A printing apparatus includes a support unit including a support surface configured to support a medium, and a printing unit configured to perform printing on the medium supported by the transport unit. The support unit includes a first member formed of metal, a second member formed of a resin, and a third member formed of metal, the third member is attached to the first member, and supports the second member, and the second member is a plate-like member that forms the support surface.

12 Claims, 7 Drawing Sheets

PRINTING APPARATUS

The present application is based on, and claims priority from JP Application Serial Number 2022-120269, filed Jul. 28, 2022, the disclosure of which is hereby incorporated by reference herein in its entirety.

BACKGROUND

1. Technical Field

The disclosure relates to a printing apparatus.

2. Related Art

Hitherto, there has been known a printing apparatus in which a support unit that supports a medium is formed of a metal material. For example, JP-A-2020-104343 discloses a printing apparatus including a table formed of a plate of metal such as aluminum and stainless steel. The printing apparatus ejects ink from an ink head onto a printed object placed on the table to perform printing.

In the printing apparatus in JP-A-2020-104343, it is required to perform positioning between the head that ejects the ink and the printed object in a height direction at high accuracy. The support unit of the printing apparatus is required to have high strength in some cases so that a jig for supporting and fixing the printed object can be used. For those reasons, the support unit of the printing apparatus is often formed of a metal material. However, the support unit formed of metal has a heavy weight. Thus, there arise problems such as difficulty in reduction of a weight of the printing apparatus, a high manufacturing cost of the printing apparatus, and a high cost for replacing the support unit when the support unit is degraded or damaged.

SUMMARY

In order to solve the above-mentioned problems, a printing apparatus includes a support unit including a support surface configured to support a medium, and a printing unit configured to perform printing on the medium supported by the transport unit, wherein the support unit includes a first member formed of metal, a second member formed of a resin, and a third member formed of metal, the third member is attached to the first member, and supports the second member, and the second member is a plate-like member that forms the support surface.

DESCRIPTION OF EXEMPLARY EMBODIMENTS

With reference to the drawings, a printing apparatus 1 according to an exemplary embodiment is described below.

1. Overall Configuration of Printing Apparatus

Figure 1:
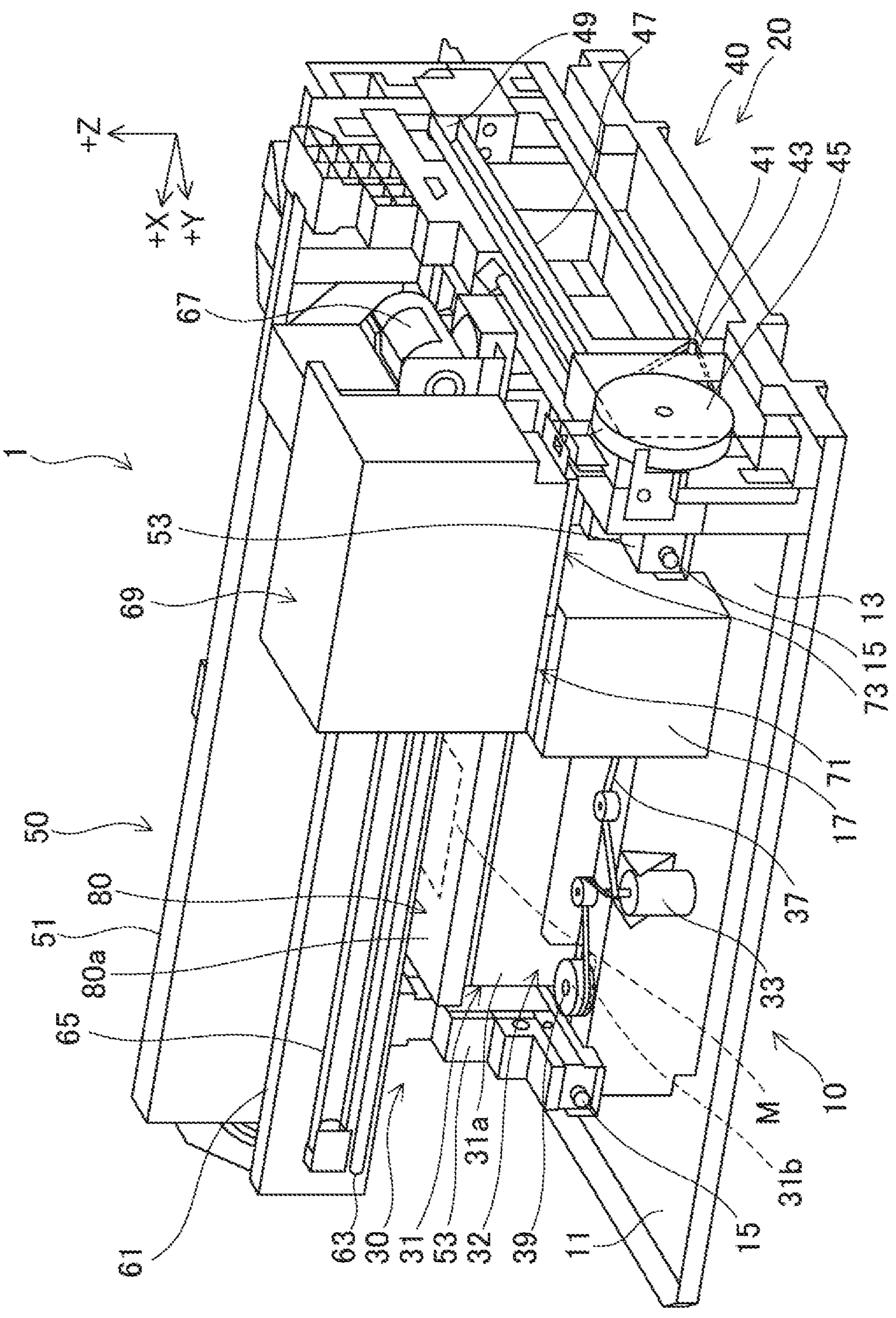
FIG. 1 is a perspective view of a printing apparatus according to an exemplary embodiment.

FIG. 1 is a perspective view of the printing apparatus 1. The printing apparatus 1 illustrated in FIG. 1 is an apparatus that performs printing by ejecting ink onto a medium M supported by a support unit 80 and irradiating the medium M with ultraviolet light to cure the ink adhering to the medium M. The medium M is, for example, a sheet, fabric, or a three-dimensional object. The sheet may be a sheet formed of paper or a synthetic resin. The fabric may be any one of non-woven fabric, knitted fabric, and cloth. The three-dimensional object includes decorative articles such as clothes and shoes, daily products, machine parts, and other various objects. The three-dimensional object may be formed by stacking the media M.

The medium M may be placed on a support surface 80*a* of the support unit 80 to be directly supported by the support surface 80*a*. The medium M may be indirectly supported on the support surface 80*a* through a jig attached to the support surface 80*a*, which is not illustrated.

FIG. 1 illustrates an X axis, a Y axis, and a Z axis. The X axis, the Y axis, and the Z axis are orthogonal to one another. The Z axis may be regarded as an axis extending in an up-and-down direction in a state in which the printing apparatus 1 is installed, and may be regarded as an axis extending in a vertical direction. The X axis and the Y axis are parallel to a horizontal plane. In the following description, it is assumed that a direction along the X axis is a right-and-left direction and a direction along the Y axis is a front-and-rear direction. Specifically, it is assumed that a positive direction along the Z axis is an upper direction, a positive direction along the X axis is a right direction, and a positive direction along the Y axis is a front direction. The X axis, the Y axis, and the Z axis in FIG. 1 indicate the same directions in the respective drawings described later. The reference symbol + in the following description and the respective drawings indicates the positive directions along the X axis, the Y axis, and the Z axis, and the reference symbol − indicates directions opposite thereto.

The printing apparatus 1 includes the support unit 80 that supports the medium M. The support unit 80 includes the support surface 80*a* that is a substantially horizontal surface facing upward. In a state in which the printing apparatus 1 is installed, the medium M is placed on the support surface 80*a* of the support unit 80. The printing apparatus 1 causes a carriage 69 to perform scanning so that the carriage 69 passes above the medium M supported on the support surface 80*a*. The carriage 69 includes a head 71 and an irradiation unit 73 that are arrayed in the right-and-left direction. The head 71 ejects the ink onto the medium M, and then the irradiation unit 73 irradiates the ink adhering to the medium M with ultraviolet light. The head 71 corresponds to an example of a "printing unit".

The printing apparatus 1 includes a printing apparatus main body 10, the support unit 80, an irradiation unit 73, and a head 71. The printing apparatus main body 10 is a section fixed on an installation surface for the printing apparatus 1, and supports each of the support unit 80, the irradiation unit 73, and the head 71. The printing apparatus 1 includes a control unit, which is not illustrated. The control unit controls each of the units provided to the printing apparatus 1.

The irradiation unit 73 includes a light-emitting element, which is not illustrated. The light-emitting element emits light under control of the control unit to perform irradiation with light in a downward direction. The light-emitting element is an Ultraviolet Light Emitting Diode (UV-LED), for example. The head 71 includes an actuator, which is not illustrated. The actuator operates under control of the control unit to eject the ink downward from a nozzle that is provided to face downward. The actuator is a piezoelectric actuator, for example.

The control unit includes a processor such as a Central Processing Unit (CPU) and a Micro Processing Unit (MPU), a volatile memory, and a non-volatile memory. The volatile memory is a Random Access Memory (RAM), for example. The non-volatile memory is configured as a Read Only Memory (ROM), a hard disk, a flash memory, or the like. The control unit executes programs stored in the volatile memory and the non-volatile memory to control each of the units of the printing apparatus 1.

The printing apparatus main body 10 includes a bottom plate 11, a base unit 13, a support unit moving mechanism 30, a driving mechanism 20, and a moving unit 50. The bottom plate 11 is a plate-like member placed on the installation surface for the printing apparatus 1. The base unit 13 is supported on an upper surface of the bottom plate 11, and supports each part of the printing apparatus main body 10.

The support unit moving mechanism 30 includes a support leg 31 and a height moving mechanism 32. The support leg 31 is a member that supports the support unit 80 in the printing apparatus main body 10. The support unit 80 is supported on the pair of support legs 31 that are arrayed in the front-and-rear direction. A supporting unit attachment surface, which is not illustrated, is provided at an upper end of the support leg 31. The supporting unit attachment surface is a substantially horizontal surface. The support leg 31 supports the support unit 80 on the supporting unit attachment surface. Each of the support legs 31 includes a leg portion 31*a*. The leg portion 31*a* is a portion of the support leg 31 that extends downward from the supporting unit attachment surface. A horizontal portion 31*b* along the substantially horizontal direction is formed at the lower end of the leg portion 31*a* and both the ends thereof in the right-and-left direction. The support leg 31 is supported by the height moving mechanism 32 through the horizontal portion 31*b*.

The height moving mechanism 32 includes an elevation motor 33, an elevation belt 37, and an elevation mechanism 39, and moves the support leg 31 in the up-and-down direction. The elevation mechanism 39 is provided to each of the four horizontal portions 31*b*. The elevation mechanism 39 includes ball screws arranged along the Z axis, nuts threaded with the ball screws, and pulleys. The ball screw of the elevation mechanism 39 is rotatably supported by the base unit 13. The nut of the elevation mechanism 39 is fixed to the horizontal portion 31*b*. The pulley of the elevation mechanism 39 is fixed to an upper part of the ball screw. When the pulley of the elevation mechanism 39 rotates, the ball screw rotates. As the ball screw rotates, the support leg 31 is moved along the Z axis together with the nut.

The elevation motor 33 is a motor that rotates under control of the control unit. The control unit controls a rotation direction and a rotation amount of the elevation motor 33. The elevation belt 37 is a ring-like belt stretched over an output shaft of the elevation motor 33 and the pulleys of the four elevation mechanisms 39. The elevation motor 33 rotates, and thus drives the elevation belt 37 to circulate. The elevation belt 37 transmits rotation of the elevation motor 33 to the pulleys of the four elevation mechanisms 39. With this, the ball screw of the elevation mechanism 39 rotates to move the support leg 31 along the Z axis.

The rotation direction of the elevation motor 33 can be switched between a regular direction of moving the support leg 31 upward and a reverse direction of moving the support leg 31 downward. The printing apparatus 1 operates the elevation motor 33 to lift and lower the support leg 31.

The printing apparatus 1 changes a height of the support leg 31 in this manner to change a height of the support unit 80. With this, the printing apparatus 1 adjusts a distance between the medium M supported on the support surface 80*a* and the nozzle of the head 71 to a distance optimized for printing.

The driving mechanism 20 includes a pair of guide shafts 15 and a frame driving unit 40. The pair of guide shafts 15 are shaft-like members that are stretched over the pair of base units 13 and are arranged along the Y axis. The support unit moving mechanism 30 and the support unit 80 are arranged between the pair of guide shafts 15.

The moving unit 50 includes a main frame 51 and a pair of frame leg portions 53.

The main frame 51 is a plate-like member elongated in a direction along the X axis. The pair of frame leg portions 53 is supported by the pair of guide shafts 15, respectively, movably in the front-and-rear direction. The main frame 51 is fixed on the pair of frame leg portions 53, and is supported by the pair of frame leg portions 53 from below. The main frame 51 is guided by the guide shafts 15 together with the pair of frame leg portions 53, and moves along the Y axis. The support unit 80 is arranged between the pair of guide shafts 15, and hence the main frame 51 is movable along the Y axis above the support unit 80.

The frame driving unit 40 includes a frame moving motor 41, a transmission belt 43, a speed-changing mechanism 45, and a transmission belt 47.

The frame moving motor 41 is a motor that rotates under control of the control unit, which is described later. The transmission belt 43 is a ring-like belt stretched between an output shaft of the frame moving motor 41 and the speed-changing mechanism 45, and transmits a driving force of the frame moving motor 41 to the speed-changing mechanism 45. The speed-changing mechanism 45 includes a first pulley and a second pulley. The transmission belt 43 is wound about the first pulley, and the transmission belt 47 is wound about the second pulley. The speed-changing mechanism 45 rotates the second pulley with a driving force transmitted from the transmission belt 43 to the first pulley. With this, the transmission belt 47 is driven. The speed-changing mechanism 45 transmits a driving force of the frame moving motor 41 to the transmission belt 47 at a speed reduction ratio corresponding to a ratio of the diameters of the first pulley and the second pulley.

The transmission belt 47 is a ring-like belt stretched over the speed-changing mechanism 45 and a pulley 49 that is arranged at an end portion of the base unit 13 in the −Y direction. The pulley 49 is rotatably installed with respect to the base unit 13. The transmission belt 47 is arranged along the Y axis. The frame leg portions 53 are fixed to the transmission belt 47. Thus, when the transmission belt 47 is driven to circulate, power for moving the frame leg portions 53 along the Y axis acts. With this, the moving unit 50 moves along the Y axis.

The rotation direction of the frame moving motor 41 can be switched between a regular direction of moving the main frame 51 in the +Y direction and a reverse direction of moving the main frame 51 in the −Y direction. The printing apparatus 1 operates the frame moving motor 41 to move the main frame 51 frontward and rearward.

The main frame 51 includes a carriage support frame 61, a carriage guide shaft 63, a carriage driving motor 67, and the carriage 69. The carriage 69 is a structure body that supports the head 71 and the irradiation unit 73 in the printing apparatus main body 10.

The carriage support frame 61 is a plate-like member that is fixed to the main frame 51 and is elongated in a direction along the X axis. The carriage guide shaft 63 is fixed to the carriage support frame 61 along the X axis. The carriage 69 is supported by the carriage support frame 61 and the carriage guide shaft 63, and is movable along the carriage guide shaft 63. It is assumed that, within a range in which the carriage 69 moves along the X axis, a position corresponding to the left end is a home position. The printing apparatus main body 10 includes a cleaner 17 that performs maintenance work such as flushing and cleaning for the head 71 at the home position. In FIG. 1, the carriage 69 is at the home position.

The carriage driving motor 67 is a motor that rotates under control of the control unit. Rotation of the carriage driving motor 67 is transmitted to a carriage driving belt 65 to drive the carriage driving belt 65 to circulate.

The carriage driving belt 65 is a ring-like belt stretched along the X-axis direction with respect to the carriage support frame 61. The carriage 69 is coupled to the carriage driving belt 65. Thus, when the carriage driving belt 65 is driven to circulate, the carriage 69 moves along the X axis. When the main frame 51 moves along the Y axis, the carriage 69 moves in the front-and-rear direction, in other words, in the +Y direction and the −Y direction. Therefore, in the printing apparatus 1, the head 71 and the irradiation unit 73 that are supported by the carriage 69 can move above the support unit 80 in the front-and-rear direction and the right-and-left direction.

2. Configuration of Support Unit

Figure 2:
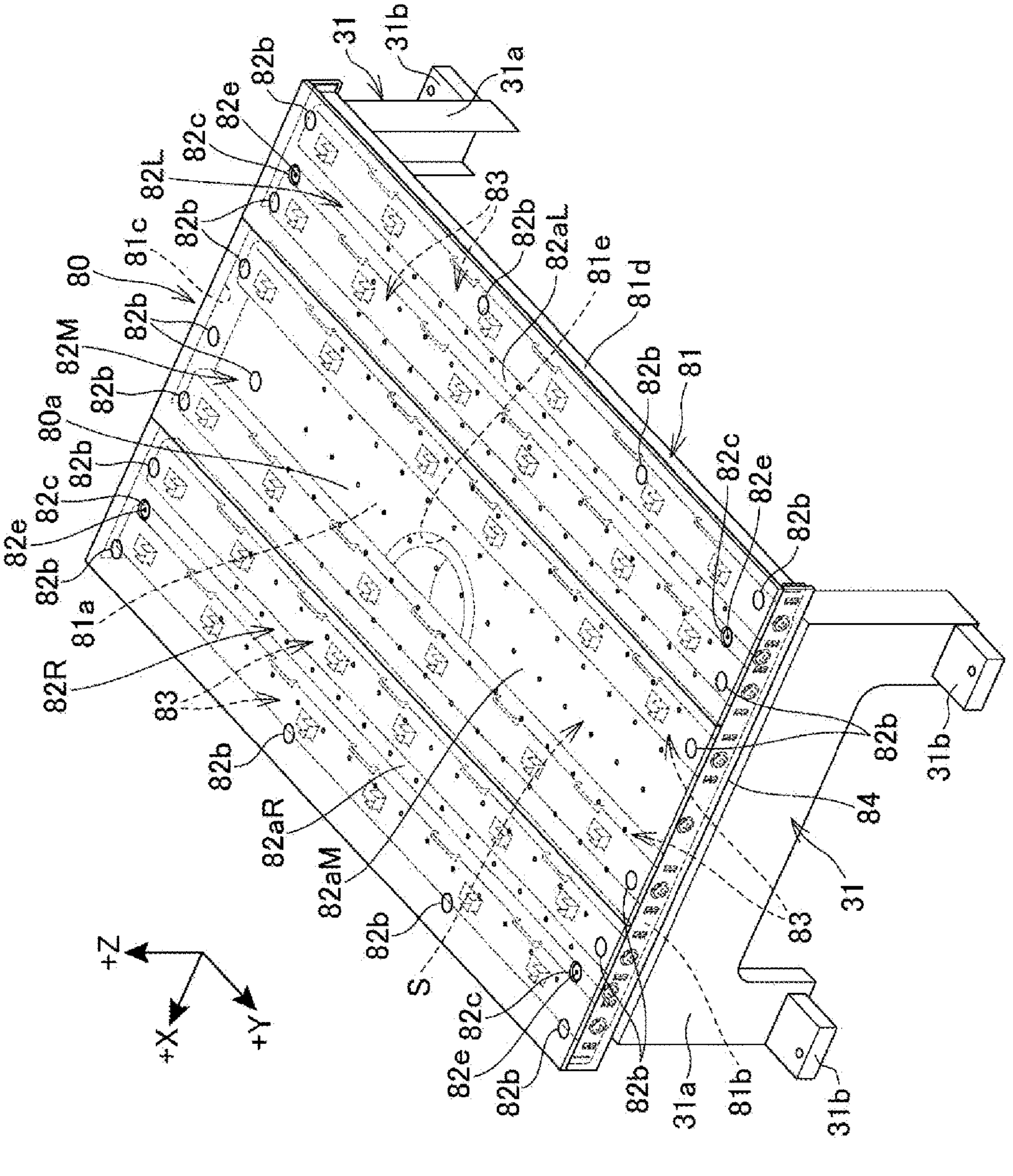
FIG. 2 is a perspective view of a support unit according to the exemplary embodiment.

FIG. 2 is a perspective view of the support unit 80.

The support unit 80 is a flat plate-like structure body that is supported on the support leg 31 of the support unit moving mechanism 30. The support unit 80 includes a first member 81, three second members 82L, 82M, and 82R, and six third members 83.

The first member 81 is a metal member, and is formed by subjecting an iron metal plate to processing. The first member 81 is a member that is arranged at the bottom of the support unit 80 and is supported by the support leg 31. The first member 81 includes a bottom surface 81*a*, a front surface 81*b*, a rear surface 81*c*, and a pair of side surfaces 81*d*. The bottom surface 81*a* is a substantially horizontal surface having a substantially rectangular shape in plan view. The bottom surface 81*a* is attached to the support leg 31 of the printing apparatus main body 10 by screw-fastening. A suction air hole 81*e* being a hole passing through the bottom surface 81*a* is formed in the periphery of the center of the bottom surface 81*a*. The front surface 81*b* is a substantially rectangular surface that stands upward from the front end of the bottom surface 81*a*. The rear surface 81*c* is a substantially rectangular surface that stands upward from the rear end of the bottom surface 81*a*. The pair of side surfaces 81*d* are surfaces that stand upward from both the ends of the bottom surface 81*a* in the right-and-left direction.

The second member 82L is a plate-like member that is formed of a synthetic resin and has a substantially rectangular shape elongated in the front-and-rear direction. The second member 82L includes a support surface portion 82*a*L. The support surface portion 82*a*L is a flat plate-like portion having a substantially rectangular shape in plan view. A second member 82M and a second member 82R are members similar to the second member 82L, and include support surface portions 82*a*M and 82*a*R, respectively. The second members 82L, 82M, and 82R are arrayed close to each other in the order of the second members 82L, 82M, and 82R from the left side to the right side. In a state in which the printing apparatus 1 is installed, each of the support surface portions 82*a*L, 82*a*M, and 82*a*R is substantially horizontal. The support surface portions 82*a*L, 82*a*M, and 82*a*R are joined to each other to form the one support surface 80*a*. The edge of the support surface 80*a* is close to the front surface 81*b*, the rear surface 81*c*, and the pair of side surfaces 81*d* of the first member 81. Thus, a suction air space S being a closed space is formed between the first member 81 and the support surface 80*a*.

An attachment hole 82*b* and a suction hole are formed in the support unit 80. The attachment hole 82*b* is a hole in which a jig or a tool for fixing and supporting the medium M can be attached. When the medium M is a three-dimensional object, a jig for fixing or supporting the medium M is used in some cases so as to prevent displacement of the medium M during printing. Such as jig is attached to the support unit 80 as required. The support surface portion 82*a*L is provided with an attachment portion as a configuration for temporarily attaching the jig to the support surface 80*a*. The attachment hole 82*b* is an example of the attachment portion. The attachment portion is not limited to a hole, and may be a protrusion or a claw for hooking the jig for fixation, for example. The number, shape, size, and position of the attachment hole 82*b* in the support unit 80 are determined in accordance with a type of the jig that may be used in the printing apparatus 1. In the present exemplary embodiment, the attachment hole 82*b* is provided in each of the support surface portions 82*a*L, 82*a*M, and 82*a*R.

The attachment hole 82*b* is open upward, and does not pass through the support surface portions 82*a*L, 82*a*M, and 82*a*R. The attachment hole 82*b* is open upward in the support surface 80*a*. Thus, for example, the jig can be installed in the support unit 80 by inserting a leg portion of the jig into the attachment hole 82*b*.

The suction hole is an air vent hole for causing an air to flow from the support surface 80*a* to the suction air space S. The suction hole is a hole vertically passing through the support surface portions 82*a*L, 82*a*M, and 82*a*R, and has a cross-sectional area smaller than that of the attachment hole 82*b*. The number of the suction holes provided in the support surface portions 82*a*L, 82*a*M, and 82*a*R is not limited, and a plurality of suction holes may be provided.

The service hole 82*c* is formed in the second members 82L and 82R. The service hole 82*c* is a hole into which the jig is inserted at the time of attaching the support unit 80 to the support leg 31. The service hole 82*c* is a hole passing through the support surface portions 82*a*L and 82*a*R, and is positioned above the fastening position between the support leg 31 and the bottom surface 81*a* of the first member 81. As illustrated in FIG. 2, the service hole 82*c* is closed by a cap 82*e* being a resin lid during operation of the printing apparatus 1.

The third member 83 is a metal member, and is formed by subjecting an iron metal plate to processing. The third member 83 is a long and thin columnar member, and is arranged so that the longitudinal direction thereof extends along the front-and-rear direction. The third member 83 does not contact with the bottom surface 81*a* of the first member 81. As described later, the third member 83 is fixed to the front surface 81*b*, and is engaged with the rear surface 81*c*. The third members 83 support the second members 82L, 82M, and 82R from below.

Figure 3:
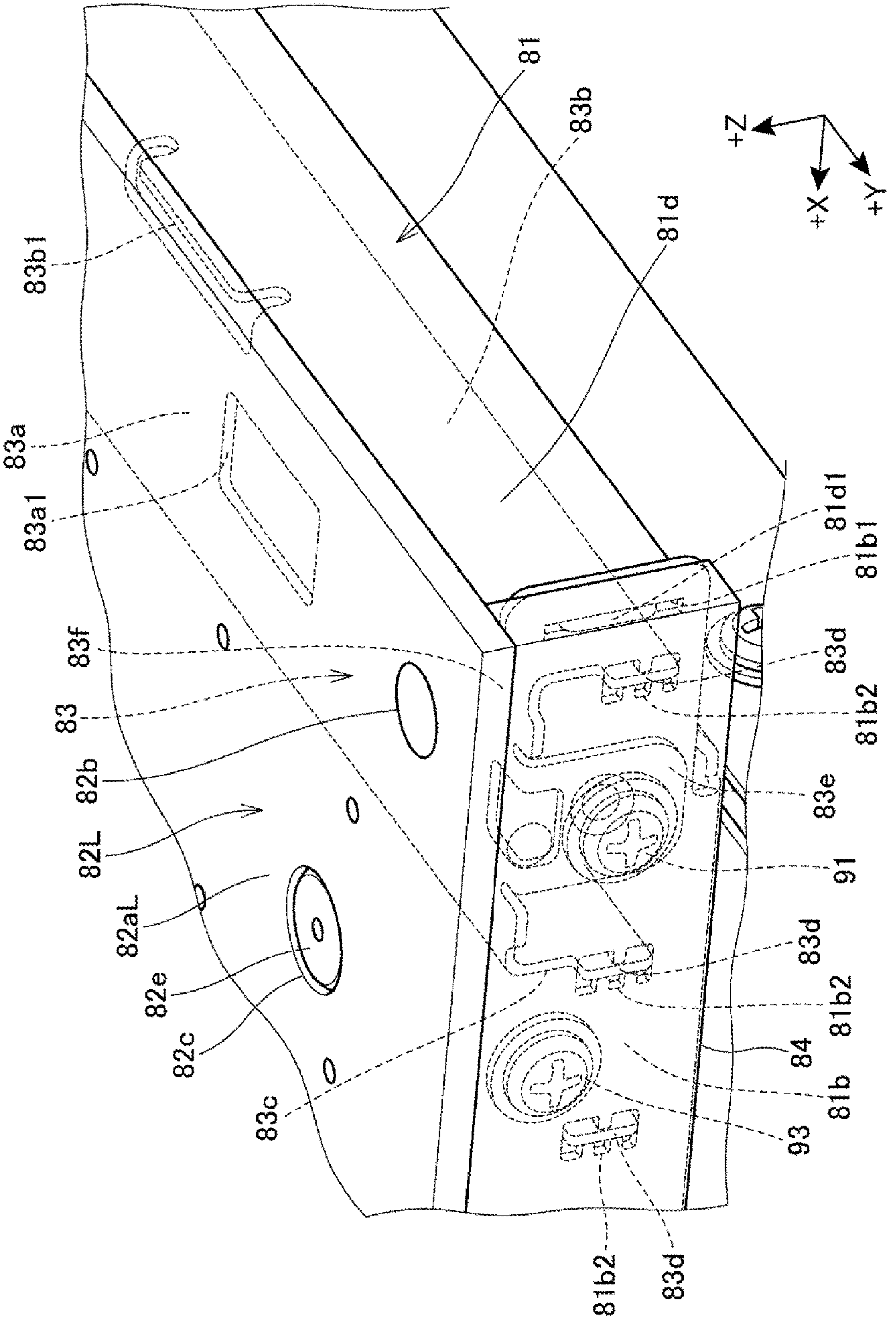
FIG. 3 is a perspective view of the main parts of the support unit according to the exemplary embodiment.

FIG. 3 is a perspective view of the main parts of the support unit 80, illustrating the support unit 80 from the front. As illustrated in FIG. 3, a front surface sealing member 84 is attached to the front surface 81*b* of the first member 81. The front surface sealing member 84 is a band-like member formed of an elastic material such as rubber and a synthetic resin. The front surface sealing member 84 is attached to cover the front surface 81*b*. The front surface sealing member 84 improves airtightness between the suction air space S and the outside of the support unit 80 at the front surface 81*b*.

As illustrated in FIG. 3, the third member 83 includes a top surface portion 83*a* including a top surface of the third member 83, a left side surface 83*b* being a surface bent downward from the left end of the top surface portion 83*a*, and a right side surface 83*c* being a surface bent downward from the right end of the top surface portion 83*a*. A plurality of hook holes 83*a*1 are formed in the top surface portion 83*a*. The hook hole 83*a*1 is a hole that passes through the top surface portion 83*a* and has a substantially rectangular shape. The hook holes 83*a*1 are arranged to be arrayed in the front-and-rear direction in the top surface portion 83*a*. A pair of right and left front end protrusions 83*d* being protrusions that protrude frontward are formed at the front end portion 83*f* of the third member 83 on the left side surface 83*b* and the right side surface 83*c*.

On the left side surface 83*b*, the plurality of projection portions 83*b*1 are formed to be arrayed in the front-and-rear direction. The projection portion 83*b*1 is a substantially U-like protrusion that stands upward from the upper end of the left side surface 83*b*. A metal plate before the left side surface 83*b* is bent and formed is subjected to punching to have a substantially U-like shape, and then the left side surface 83*b* is bent and formed by rolling up the portion punched into a substantially U-like shape. Thus, the projection portion 83*b*1 is formed. With this, accuracy of the height of the upper end of the projection portion 83*b*1 does not depend on dimension accuracy of bending processing, but depends on dimension accuracy of punching processing. Therefore, the heights of the upper ends of the plurality of projection portions 83*b*1 formed on the one third member 83 are easily flush with one another at high accuracy.

A slit hole 81*b*1 and a front surface positioning hole 81*b*2 are formed in the front surface 81*b*. The slit hole 81*b*1 is a hole that is formed at both the right and left ends of the front surface 81*b* and is elongated in the vertical direction. A side surface protruding portion 81*d*1 is inserted into the slit hole 81*b*1. The side surface protruding portion 81*d*1 is formed to protrude frontward from the front end of the side surface 81*d*. With this, the side surface 81*d* and the front surface 81*b* are coupled to each other, and strength of the first member 81 is increased. Note that the side surface 81*d* and the rear surface 81*c* are coupled to each other with a configuration similar to that described above.

The front surface positioning hole 81*b*2 is a hole that passes through the front surface 81*b* and is elongated in the up-and-down direction, and has recesses and projections in the right-and-left direction. The minimum width of the front surface positioning hole 81*b*2 in the right-and-left direction is substantially equivalent to the thickness of the front end protrusion 83*d* of the third member 83. The length of the front surface positioning hole 81*b*2 in the up-and-down direction is substantially equivalent to the dimension of the front end protrusion 83*d* in the up-and-down direction. The number of the front surface positioning holes 81*b*2 provided in the front surface 81*b* is twice as much as the number of the third members 83 provided to the support unit 80. The respective front surface positioning holes 81*b*2 are provided to be arrayed in the right-and-left direction at the substantially same height positions. The plurality of front surface positioning holes 81*b*2 are formed by punching processing with a die with respect to the metal plate before the metal plate is subjected to processing to obtain the first member 81. Therefore, accuracy of the positional relationship between the plurality of front surface positioning holes 81*b*2 depends on accuracy of punching processing. Thus, the plurality of front surface positioning holes 81*b*2 are easily arranged to be arrayed in the front surface 81*b* at the substantially same heights at high accuracy.

The front end protrusion 83*d* of the third member 83 is inserted into the front surface positioning hole 81*b*2. With this, the front end portion 83*f* of the third member 83 is positioned with respect to the first member 81 in the right-and-left direction and the up-and-down direction. In this state, the plurality of front surface positioning holes 81*b*2 are arranged to be arrayed at the substantially same heights at high accuracy. Thus, the plurality of front end portions 83*f* of the third member 83 are easily positioned at substantially same angles and heights.

Moreover, the third member 83 includes a fastening portion 83*e* at the front end portion 83*f*. The fastening portion 83*e* is formed and bent downward from the top surface portion 83*a*. The fastening portion 83*e* is fastened to the front surface 81*b* with a screw 91. With this, the front end portion 83*f* of the third member 83 is fixed to the front surface 81*b* of the first member 81. The second members 82L, 82M, and 82R are fastened to the front surface 81*b* with screws 93. The front end portion 83*f* corresponds to an example of "a first end portion".

Figure 4:
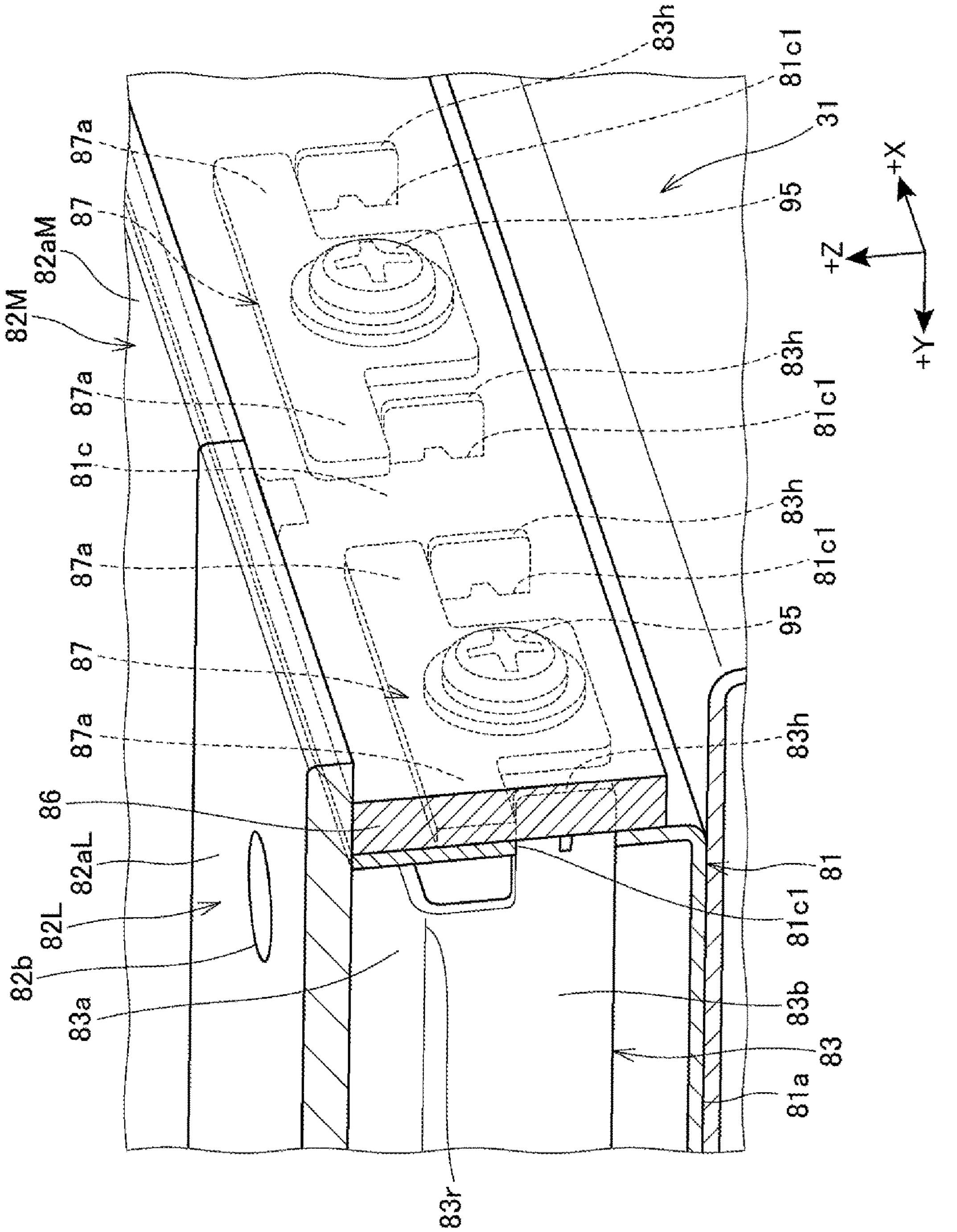
FIG. 4 is a perspective view of the main parts of the support unit according to the exemplary embodiment.

FIG. 4 is a perspective view of the main parts of the support unit 80, illustrating the support unit 80 from behind. As illustrated in FIG. 4, a rear surface sealing member 86 is attached to the rear surface 81*c*. The rear surface sealing member 86 is a band-like member formed by a resin such as rubber, and is attached to cover the rear surface 81*c* from behind. The rear surface sealing member 86 improves airtightness between the suction air space S and the outside of the support unit 80 at the rear surface 81*c*.

As illustrated in FIG. 4, the third member 83 includes a rear end protrusion 83*h* at a rear end portion 83*r*. The rear end protrusions 83*h* are a pair of right and left protrusions that protrude rearward from the left side surface 83*b* and the right side surface 83*c* at the rear end portion 83*r*.

As illustrated in FIG. 4, the rear surface 81*c* includes a plurality of rear surface positioning holes 81*c*1. The rear surface positioning hole 81*c*1 is a hole elongated in the up-and-down direction, and has recesses and projections in the right-and-left direction. The minimum width of the rear surface positioning hole 81*c*1 in the right-and-left direction is substantially equivalent to the thickness of the rear end protrusion 83*h*. The length of the rear surface positioning hole 81*c*1 in the up-and-down direction is substantially equivalent to the dimension of the rear end protrusion 83*h* in the up-and-down direction. The number of the rear surface positioning holes 81*c*1 is twice as much as the number of the third members 83 provided to the support unit 80. The rear surface positioning holes 81*c*1 are formed to be arrayed in the rear surface 81*c* in the right-and-left direction at the substantially same heights. The plurality of rear surface positioning holes 81*c*1 are formed by punching processing with a die with respect to the metal plate before the metal plate is subjected to processing to obtain the first member 81. Therefore, accuracy of the positional relationship between the plurality of rear surface positioning holes 81*c*1 depends on accuracy of punching processing. Thus, the plurality of rear surface positioning holes 81*c*1 are easily arranged to be arrayed in the rear surface 81*c* at the substantially same heights at high accuracy.

The rear end protrusion 83*h* formed in the third member 83 is inserted into the rear surface positioning hole 81*c*1. With this, the rear end portion 83*r* of the third member 83 is coupled to the rear surface 81*c* of the first member 81. The length of the rear end protrusion 83*h* in the up-and-down direction is substantially equivalent to the rear surface positioning hole 81*c*1. Thus, movement of the third member 83 in the up-and-down direction is regulated by the rear surface positioning hole 81*c*1 of the first member 81. Similarly, the minimum width of the rear surface positioning hole 81*c*1 in the right-and-left direction and the width of the rear end protrusion 83*h* in the right-and-left direction have the substantially same dimensions. Thus, movement of the rear end portion 83*r* of the third member 83 in the right-and-left direction is regulated by the rear surface positioning hole 81*c*1. The rear end portion 83*r* corresponds to an example of "a second end portion".

Further, regulation members 87 are attached to the rear surface 81*c*. The number of the regulation members 87 is equivalent to the number of the third members 83. The regulation member 87 is a plate-like member having a substantially T-like shape, and includes regulation portions 87*a* each extending in the right-and-left direction. The regulation member 87 is fastened to the rear surface 81*c* with a screw 95. The regulation member 87 is arranged at a position at which the lower ends of the regulation portions 87*a* respectively abut from above against the pair of rear end protrusions 83*h* formed on the third member 83. With this, the rear end protrusion 83*h* abuts against the lower edge of the rear surface positioning hole 81*c*1, and regulates movement of the third member 83 in the up-and-down direction. The rear end protrusion 83*h* abuts against the lower end of the rear surface positioning hole 81*c*1, and thus the rear end portion 83*r* of the third member 83 is positioned with respect to the first member 81 in the up-and-down direction. As described above, the plurality of rear surface positioning holes 81*c*1 are easily arranged to be arrayed in the rear surface 81*c* at the substantially same heights at high accuracy. Therefore, the rear end portions 83*r* of the third members 83 are easily positioned at the substantially same angles and heights.

As described above, movement of the rear end portion 83*r* is regulated with respect to the rear surface 81*c* in the right-and-left direction and the up-and-down direction. Meanwhile, the rear end portion 83*r* does not abut against the rear surface 81*c* in the front-and-rear direction, and hence the rear end portion 83*r* is movable with respect to the rear surface 81*c* in the front-and-rear direction. With this, when the third member 83 is finely expanded or contracted in the front-and-rear direction due to a temperature change, a load applied to the front surface 81*b* and the rear surface 81*c* is easily suppressed. With this, deformation of the support unit 80 due to a temperature change can easily be suppressed. The front-and-rear direction corresponds to an example of "a direction intersecting with the up-and-down direction".

Figure 5:
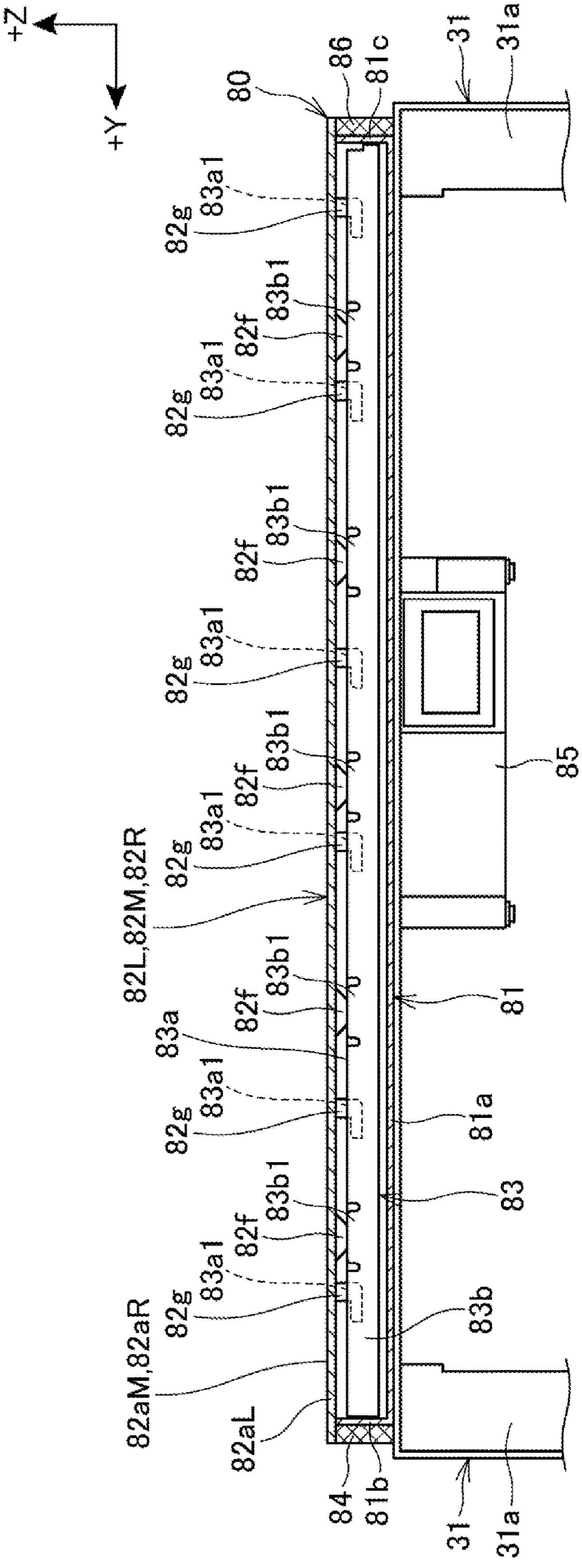
FIG. 5 is a cross-sectional view of the support unit according to the exemplary embodiment.

FIG. 5 is a cross-sectional view of the support unit 80, illustrating a cross-section of the support unit 80 that is vertical to the X axis. As illustrated in FIG. 5, a plurality of abutting portions 82*f* and a plurality of hook portions 82*g* are formed on the lower surfaces of the support surface portions 82*a*L, 82*a*M, and 82*a*R. The abutting portion 82*f* is a protrusion having a trapezoidal shape in a side view from the right-and-left direction, and protrudes downward from the lower surfaces of the support surface portions 82*a*L, 82*a*M, and 82*a*R. The hook portion 82*g* is an L-like hook formed into a shape that protrudes downward from the lower surfaces of the support surface portions 82*a*L, 82*a*M, and 82*a*R and is bent frontward in a substantially vertical direction at a lower end.

As illustrated in FIG. 5, the lower end of the abutting portion 82*f* abuts from above against the projection portion 83*b*1 formed on the third member 83. With this, the position of the abutting portion 82*f* in the up-and-down direction is determined by the projection portion 83*b*1 of the third member 83. In other words, the projection portion 83*b*1 abuts from below against the abutting portion 82*f*, and supports the support surface portions 82*a*L, 82*a*M, and 82*a*R from below through the abutting portion 82*f*. In this manner, the second members 82L, 82M, and 82R formed of a resin are supported by the third members 83 and the first member 81 that are formed of metal having high strength. Thus, for example, when the medium M having a heavy weight is placed on the support surface 80*a*, the support surface 80*a* is less likely to be deformed.

The hook portion 82*g* is inserted into the hook hole 83*a*1 formed in the top surface portion 83*a* of the third member 83, and hooks on the top surface portion 83*a*. With this, the hook portion 82*g* abuts from above against the top surface portion 83*a*. The support surface portions 82*a*L, 82*a*M, and 82*a*R of the second members 82L, 82M, and 82R are pulled downward by the hook portions 82*g*. Thus, the abutting portion 82*f* is less likely to float from the projection portion 83*b*1, and the position of the abutting portion 82*f* in the up-and-down direction is easily determined by the projection portion 83*b*1 of the third member 83.

As described above, the front end portions 83*f* and the rear end portions 83*r* of the plurality of third members 83 provided to the support unit 80 are easily positioned at the substantially same angles and heights. The heights of the upper ends of the plurality of projection portions 83*b*1 formed on the one third member 83 are easily flush with one another at high accuracy. Therefore, the upper ends of the projection portions 83*b*1 formed on the plurality of third members 83 provided to the support unit 80 are easily flush with one another at the substantially same heights. Thus, the abutting portions 82*f* positioned by the projection portions 83*b*1 in the up-and-down direction are easily positioned at the substantially same heights. Thus, the support surface portions 82*a*L, 82*a*M, and 82*a*R are easily supported at the substantially same heights. In other words, the support surface portions 82*a*L, 82*a*M, and 82*a*R and the support surface 80*a* are easily arranged substantially horizontally, and easily form a flat surface at high accuracy.

As illustrated in FIG. 5, a fan 85 is attached to a lower surface of the bottom surface 81*a*. The fan 85 is a blower, for example. The fan 85 operates under control of the control unit, sucks an air through a suction port, which is not illustrated, and discharges an air through a discharge port, which is not illustrated. The suction port of the fan 85 communicates with the suction air hole 81*e* formed in the bottom surface 81*a* of the first member 81, and thus the fan 85 sucks an air of the suction air space S through the suction air hole 81*e*. With this, an internal pressure of the suction air space S is reduced, and an air flows in the suction air space S through the suction holes passing through the support surface portions 82*a*L, 82*a*M, and 82*a*R. For example, when the medium M having a sheet-like shape is placed on the support surface 80*a*, the medium M is sucked on the support surface 80*a*. The fan 85 corresponds to an example of "a suction unit".

Figure 6:
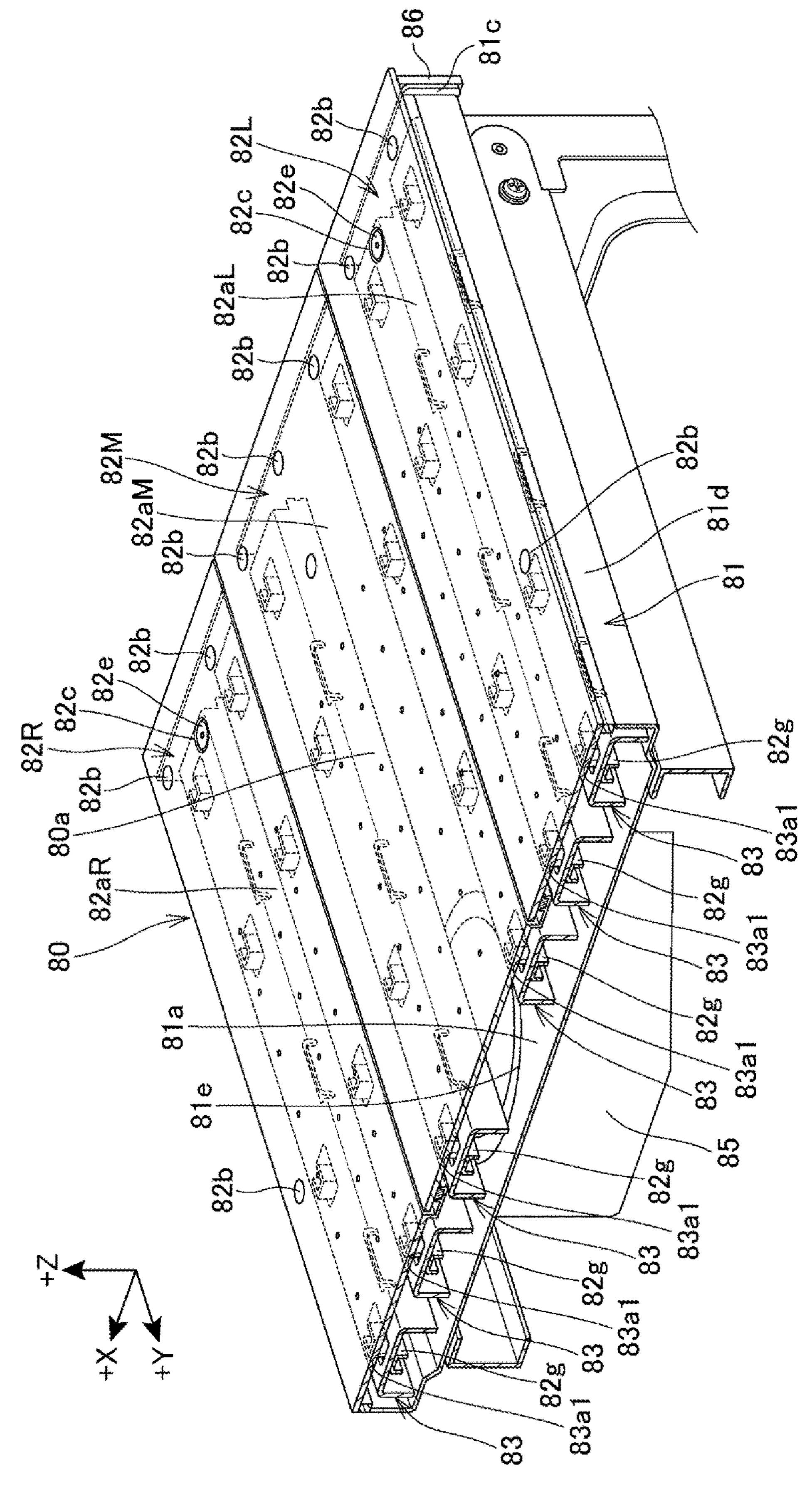
FIG. 6 is a partially-expanded perspective view of the support unit according to the exemplary embodiment.

FIG. 6 is a partially-expanded perspective view of the support unit 80, illustrating the support unit 80 taken along a plane vertical to the Y axis. As illustrated in FIG. 6, each of the second members 82L, 82M, and 82R is supported by the two third members 83. The two third members 83 that support each of the second members 82L, 82M, and 82R support both the ends of each of the second members 82L, 82M, and 82R in the right-and-left direction. With this, the second members 82L, 82M, and 82R are stably supported by the third members 83.

Figure 7:
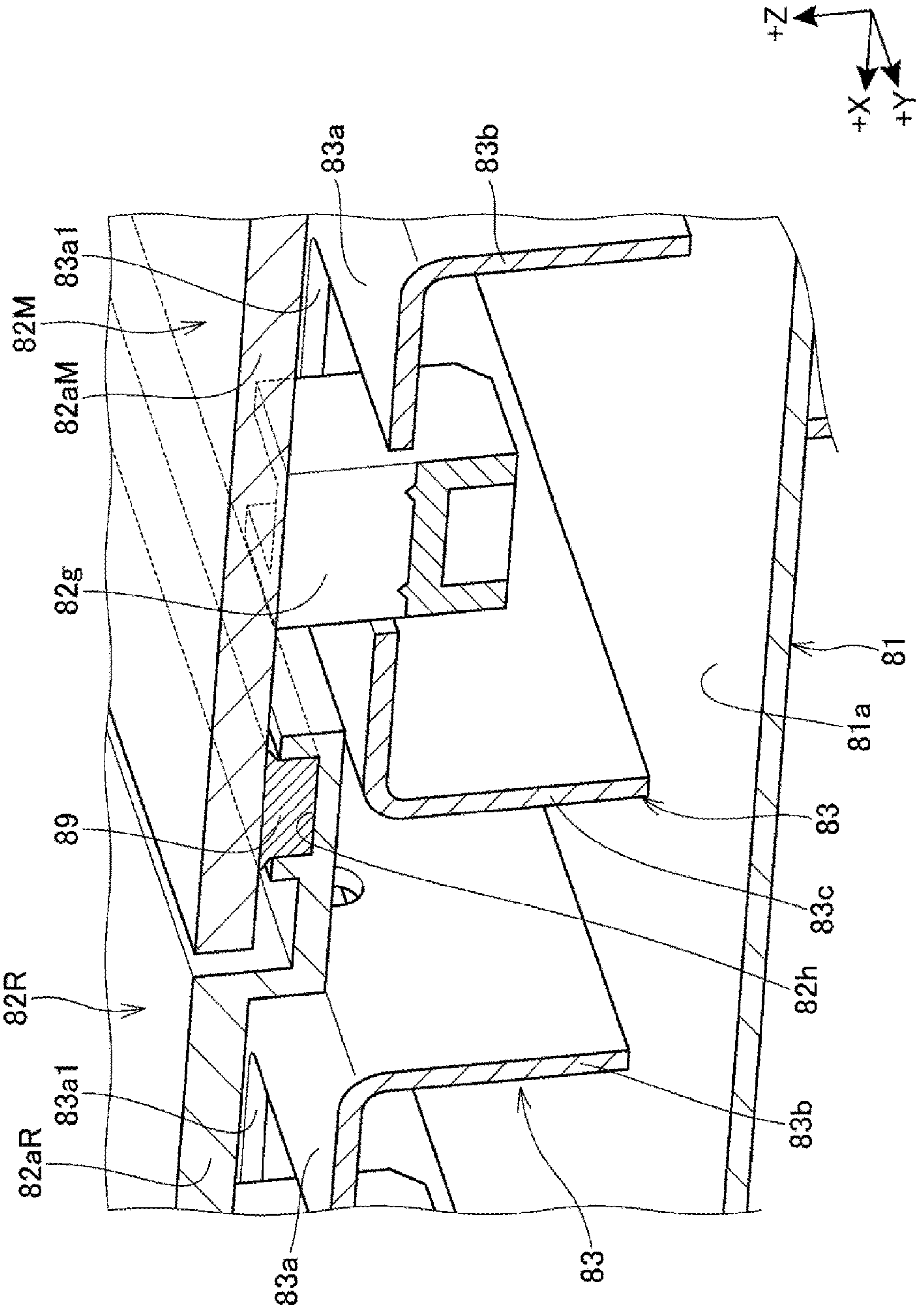
FIG. 7 is a perspective view of the main parts of the support unit according to the exemplary embodiment.

FIG. 7 is a perspective view of the main parts of the support unit 80, illustrating the support unit 80 taken along a plane vertical to the Y axis. As illustrated in FIG. 7, the second members 82M and 82R include groove portions 82 at the left end portions of the support surface portions 82*a*M and 82*a*R. The groove portions 82 extend in the front-and-rear direction. The groove portion 82*h* are grooves that are provided below the lower ends of the support surface portions 82*a*M and 82*a*R and are recessed downward, and are formed over the entire lengths of the support surface portions 82*a*M and 82*a*R in the front-and-rear direction.

As illustrated in FIG. 7, a sealing member 89 is arranged in the groove portion 82*h*. The sealing member 89 is a long and thin member formed of an elastic material, and is provided over the entire length of the groove portion 82*h*. Examples of the elastic member include sponge and a resin such as rubber. The upper end of the sealing member 89 arranged in the groove portion 82*h* of the second member 82R contacts with the lower surface of the right end of the support surface portion 82*a*M, and is deformed. Similarly, the sealing member 89 arranged in the groove portion 82*h* of the second member 82M contacts with the lower surface of the right end of the support surface portion 82*a*L, and is deformed. With this, the gaps between the second members 82L, 82M, and 82R are closed by the sealing member 89.

3. Other Exemplary Embodiments

The above-mentioned exemplary embodiment is merely a specific example to which the present disclosure is applied. The present disclosure is not limited to the configuration of the above-mentioned exemplary embodiment, and can be implemented in various modes without departing from the gist of the present disclosure.

In the above-mentioned exemplary embodiment, description is made on the case in which the support unit 80 is provided with each of the second members 82L, 82M, and 82R, that is, three in total. The configuration of the support unit 80 is not limited thereto. The support unit 80 may be provided with one or two of each of the second members 82L, 82M, and 82R, or may be provided with four or more thereof. For example, there may be adopted a configuration in which, for example, the support unit 80 is provided with the one second member 82L, the three second members 82M, and the one second member 82R in the stated order from the left side. In this case, the support unit 80 including the support surface 80*a* having a larger size can be achieved.

The material for forming the second members 82L, 82M, and 82R is not limited as long as it is a synthetic resin. For example, polypropylene, polystyrene, polyvinyl chloride, a methacrylic resin, or other types of engineering plastic may be used.

In the above-mentioned exemplary embodiment, description is made on the case in which each of the second members 82L, 82M, and 82R is supported by the two third members 83. The configuration of the support unit 80 is not limited thereto. There may be adopted a configuration in which each one of the second members 82L, 82M, and 82R is supported by the one or three or more third members 83. However, when each one of the second members 82L, 82M, and 82R is supported by the two third members 83 as in the above-mentioned exemplary embodiment, both strength of the support surface 80*a* and reduction of a weight of the support unit 80 can easily be secured.

In the above-mentioned exemplary embodiment, description is made on the case in which each of the first member 81 and the third member 83 is formed by processing the iron metal plate, which is merely an example. The first member 81 and the third member 83 may be formed by subjecting a metal plate formed of metal other than iron to processing. Examples of the metal other than iron include an iron-based alloy, aluminum or an aluminum-based alloy, and copper or a copper-based alloy. The first member 81 and the third member 83 may be formed by casting, forging, or machining instead of processing of a metal plate.

The printing apparatus 1 may not include the fan 85, and may not be configured to suck the medium M on the support surface 80*a*. In this case, each of the suction air hole 81*e* of the first member 81 and the suction holes of the second members 82L, 82M, and 82R may not be formed. The support unit 80 may include a configuration without each of the front surface sealing member 84, the rear surface sealing member 86, the groove portions 82*h* of the second members 82M and 82R, and the sealing member 89.

The printing apparatus 1 may not include the irradiation unit 73, and includes a configuration in which the ink ejected from the head 71 is cured by a method other than irradiation of ultraviolet light. For example, the printing apparatus 1 may be a so-called 3D printer, and the head 71 may be configured to eject a thermoplastic resin as ink and form the ink itself as the medium M into a three-dimensional structural object.

4. Configuration Described in Exemplary Embodiments

Based on the above-mentioned exemplary embodiments, the following configurations are described.

(Configuration 1) A printing apparatus, including a support unit including a support surface configured to support a medium, and a printing unit configured to perform printing on the medium supported by the transport unit, wherein the support unit includes a first member formed of metal, a second member formed of a resin, and a third member formed of metal, the third member is attached to the first member, and supports the second member, and the second member is a plate-like member that forms the support surface.

With this configuration, the support unit that supports the medium can be formed by using the second member formed of a resin. The configuration can secure strength and accuracy required for the support unit because the first member and the third member that are formed of metal support the second member. The configuration enables weight reduction because the second member is formed of a synthetic resin. Thus, the support unit can easily be reduced in weight, and hence weight reduction of the printing apparatus can be achieved. A manufacturing cost of the support unit can easily be reduced. Thus, it can be expected to reduce a manufacturing cost of the printing apparatus and reduce a replacement cost of the support unit when the support unit is degraded or damaged. When the support unit is degraded or damaged, the degradation or the damage can also be solved by replacing the second member. In this case, it can be expected to facilitate maintenance work for the support unit 80.

(Configuration 2) The printing apparatus according to Configuration 1, wherein the third member includes a projection portion that abuts against the second member from below, and supports the second member with the projection portion, and the first member regulates movement of the third member in an up-and-down direction.

With this configuration, the first member regulates the position of the third member in the up-and-down direction, the third member supporting the second member from below. Thus, accuracy of the support surface formed by the second member can be secured at as high accuracy as that in a case in which the support unit is formed of only a metal member.

(Configuration 3) The printing apparatus according to Configuration 1 or 2, wherein the third member is a columnar member including a first end portion and a second end portion, and the first end portion is fixed to the first member, and the second end portion is coupled to the first member movably in a direction intersecting with the up-and-down direction.

With this configuration, even when the third member formed of metal is expanded or contracted due to a temperature change or the like, deformation of the support unit can be suppressed, and accuracy of the support surface can be maintained.

(Configuration 4) The printing apparatus according to Configuration 3, wherein a regulation member is attached to the first member, the regulation member being configured to abut against the second end portion to regulate movement of the third member in the up-and-down direction. With this configuration, movement of the third member in the up-and-down direction can be regulated. Thus, the position of the support surface in the up-and-down direction can be stabilized.

(Configuration 5) The printing apparatus according to any one of Configurations 2 to 4, wherein the second member includes an abutting portion that abuts against the projection portion and a hook portion that hooks on the third member, and the hook portion abuts upward against the third member to cause the abutting portion and the projection portion to abut against each other.

With this configuration, the abutting portion of the second member abuts against the projection portion, and the hook portion of the second member hooks on the third member. Thus, the second member can securely be fixed to the third member. Thus, the position of the support surface in the up-and-down direction can be stabilized.

(Configuration 6) The printing apparatus according to any one of Configurations 1 to 5, wherein one second member is supported by at least two third members.

With this configuration, the second member is supported by the plurality of third members. Thus, strength and accuracy of the support surface can be secured.

(Configuration 7) The printing apparatus according to any one of Configurations 1 to 6, wherein the support unit includes at least two second members.

With this configuration, the support surface is formed of the plurality of second members. Thus, when the support surface is damaged or degraded, only a part of the support surfaces can be replaced. Thus, a load required for maintenance work for the support unit can be alleviated.

(Configuration 8) The printing apparatus according to any one of Configurations 1 to 7, wherein the second member is provided with an attachment portion configured to attach a jig to be mounted on the medium.

With this configuration, the jig for installing the medium on the support surface can easily be attached to the support unit.

(Configuration 9) The printing apparatus according to any one of Configurations 1 to 8, comprising: a suction unit configured to suck air, wherein a suction air space is formed, the suction air space being closed and surrounded by the first member and the second member, a suction air hole is formed in the first member, the suction air hole being configured to cause the suction unit and the suction air space to communicate with each other, and a suction hole is formed in the second member, the suction hole passing through the support surface and communicating with the suction air space.

With this configuration, an air is sucked, and thus the medium placed on the support surface can be stabilized.

(Configuration 10) The printing apparatus according to Configuration 9, wherein the support unit includes at least two second members, a groove portion is formed in at least one of the second members, a sealing member is provided in the groove portion, and the sealing member seals a gap between the second members adjacent to each other.

With this configuration, the gap between the plurality of second members is closed by the sealing member. Thus, leakage of a negative pressure can be suppressed during operation of the suction unit. With this, the medium can efficiently be stabilized.

What is claimed is:

1. A printing apparatus, comprising:

a support unit including a support surface configured to support a medium; and a printing unit configured to perform printing on the medium supported by the support unit, wherein the support unit includes a first member formed of metal, a second member formed of a resin, and a third member formed of metal, the third member is attached to the first member, and supports the second member, the second member is a plate-like member that forms the support surface, the third member does not contact with a bottom surface of the first member, the first member includes the bottom surface, a front surface, and a rear surface, and the third member is attached to the front surface and the rear surface of the first member.

2. The printing apparatus according to claim 1, wherein the third member includes a projection portion that abuts against the second member from below, and supports the second member with the projection portion, and the first member regulates movement of the third member in an up-and-down direction.

3. The printing apparatus according to claim 2, wherein the third member is a columnar member including a first end portion and a second end portion, and the first end portion is fixed to the first member, and the second end portion is coupled to the first member movably in a direction intersecting with the up-and-down direction.

4. The printing apparatus according to claim 3, wherein a regulation member is attached to the first member, the regulation member being configured to abut against the second end portion to regulate movement of the third member in the up-and-down direction.

5. The printing apparatus according to claim 2, wherein the second member includes an abutting portion that abuts against the projection portion and a hook portion that hooks on the third member, and
the hook portion abuts upward against the third member to cause the abutting portion and the projection portion to abut against each other.

6. The printing apparatus according to claim 1, wherein one second member is supported by at least two third members.

7. The printing apparatus according to claim 1, wherein the support unit includes at least two second members.

8. The printing apparatus according to claim 1, wherein the second member is provided with an attachment portion configured to attach a jig to be mounted on the medium.

9. The printing apparatus according to claim 1, comprising:
a suction unit configured to suck air, wherein
a suction air space is formed, the suction air space being closed and surrounded by the first member and the second member,
a suction air hole is formed in the first member, the suction air hole being configured to cause the suction unit and the suction air space to communicate with each other, and
a suction hole is formed in the second member, the suction hole passing through the support surface and communicating with the suction air space.

10. The printing apparatus according to claim 9, wherein the support unit includes at least two second members,
a groove portion is formed in at least one of the at least two second members,
a sealing member is provided in the groove portion, and
the sealing member seals a gap between the at least two second members adjacent to each other.

11. A printing apparatus, comprising:
a support unit including a support surface configured to support a medium; and
a printing unit configured to perform printing on the medium supported by the support unit, wherein
the support unit includes a first member formed of metal, a second member formed of a resin, and a third member formed of metal,
the third member is attached to the first member, and supports the second member,
the second member is a plate-like member that forms the support surface,
the support unit includes at least two second members,
a groove portion is formed in at least one of the second members,
a sealing member is provided in the groove portion, and
the sealing member seals a gap between the at least two second members adjacent to each other.

12. A printing apparatus, comprising:
a support unit including a support surface configured to support a medium; and
a printing unit configured to perform printing on the medium supported by the support unit, wherein
the support unit includes a first member formed of metal, a second member formed of a resin, and a third member formed of metal,
the third member is attached to the first member, and supports the second member,
the second member is a plate-like member that forms the support surface,
the third member includes a projection portion that abuts against the second member from below, and supports the second member with the projection portion,
the first member regulates movement of the third member in an up-and-down direction,
the second member includes an abutting portion that abuts against the projection portion and a hook portion that hooks on the third member, and
the hook portion abuts upward against the third member to cause the abutting portion and the projection portion to abut against each other.

* * * * *